(12) United States Patent
Oka

(10) Patent No.: US 10,325,501 B2
(45) Date of Patent: Jun. 18, 2019

(54) LANE DEVIATION SUPPRESSING SYSTEM

(71) Applicant: DENSO CORPORATION, Kariya, Aichi-pref. (JP)

(72) Inventor: Kazumichi Oka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/739,117

(22) PCT Filed: Jun. 24, 2016

(86) PCT No.: PCT/JP2016/068797
§ 371 (c)(1),
(2) Date: Dec. 21, 2017

(87) PCT Pub. No.: WO2016/208710
PCT Pub. Date: Dec. 29, 2016

(65) Prior Publication Data
US 2018/0190123 A1 Jul. 5, 2018

(30) Foreign Application Priority Data
Jun. 26, 2015 (JP) .................................. 2015-128884

(51) Int. Cl.
*G08G 1/16* (2006.01)
*B62D 15/02* (2006.01)
(Continued)

(52) U.S. Cl.
CPC ............. *G08G 1/167* (2013.01); *B60W 30/12* (2013.01); *B60W 40/10* (2013.01); *B62D 6/001* (2013.01);
(Continued)

(58) Field of Classification Search
CPC ......... G08G 1/167; G08G 1/16; B60W 30/12; B60W 40/10; B62D 6/00; B62D 6/001;
(Continued)

(56) References Cited

U.S. PATENT DOCUMENTS

2015/0012179 A1   1/2015  Matsuno
2015/0149036 A1*  5/2015  You ...................... B60W 30/12
                                                    701/41
(Continued)

FOREIGN PATENT DOCUMENTS

JP   2010-163164 A   7/2010
JP   2014-151758 A   8/2014
(Continued)

*Primary Examiner* — Marthe Y Marc-Coleman
(74) *Attorney, Agent, or Firm* — Knobbe, Martens, Olson & Bear, LLP

(57) ABSTRACT

A lane-deviation-suppressing-system (1) sets a target point in front of a lane when a vehicle travels, and calculates, as a target trajectory, an trajectory causing the vehicle to travel to the set target trajectory, using a polynomial of fifth-order with respect to time. Then, the system judges that a recalculation of the target trajectory is necessary if the vehicle traveling along the target trajectory returns to the target point after separating from the target point in an orthogonal direction to an extending direction of the lane. If the system judges that the recalculation of the target trajectory is necessary, it recalculates that. For calculating the target trajectory, depending on a vehicle traveling state, the system selects a fifth or higher order polynomial or a polynomial of first-order with respect to time. If using the first-order polynomial, it is used by calculating a lateral speed at which the vehicle moves in the orthogonal direction.

12 Claims, 8 Drawing Sheets

(51) Int. Cl.
  *B62D 6/00* (2006.01)
  *B60W 30/12* (2006.01)
  *B60W 40/10* (2012.01)

(52) U.S. Cl.
  CPC ........... *B62D 6/002* (2013.01); *B62D 15/025* (2013.01); *B62D 15/0265* (2013.01)

(58) Field of Classification Search
  CPC ... B62D 6/002; B62D 15/025; B62D 15/0265
  USPC ................... 701/42; 382/103; 340/903, 435
  See application file for complete search history.

(56) References Cited

U.S. PATENT DOCUMENTS

2015/0274158 A1* 10/2015 Fujita ................... B60W 30/00
                                                              701/23
2016/0107645 A1    4/2016 Okuda et al.

FOREIGN PATENT DOCUMENTS

| | | |
|---|---|---|
| JP | 2015-003566 A | 1/2015 |
| JP | 2015-013545 A | 1/2015 |
| JP | 2015-058890 A | 3/2015 |
| JP | 2015-058903 A | 3/2015 |
| JP | 2015-230547 A | 12/2015 |

\* cited by examiner (a)

(b)

(a)

(b)

(a)

(b)

(c)

LANE DEVIATION SUPPRESSING SYSTEM

CROSS-REFERENCE TO RELATED PATENT APPLICATION

This application is based on and claims the benefit of priority from earlier Japanese Patent Application No. 2015-128884, filed Jun. 26, 2015, the description of which is incorporated herein by reference.

TECHNICAL FIELD

The present invention relates to a lane deviation suppressing system suppressing deviation of a vehicle from a lane.

BACKGROUND ART

As for an automatic operation of a vehicle, a variety of technologies have been proposed such as processing for generating a trajectory of an own vehicle, feedforward control and feedback control for causing an own vehicle to travel along a trajectory, and lane deviating suppressing control for suppressing an own vehicle from deviating from a lane (see PLTs 1 to 4, for example).

CITATION LIST

Patent Literature

[PLT 1] JP 2014-151758 A
[PLT 2] JP 2015-58890A
[PLT 3] JP 2015-58903A
[PLT 4] JP 2015-13545A

SUMMARY OF THE INVENTION

Technical Problem

The above-mentioned lane deviation suppressing control is required to have both stability of a torque output of an own vehicle and robustness for feedback control. In order to satisfy the both requirements, it is necessary to generate a target trajectory and combine the feedforward control and the feedback control for causing an own vehicle to travel along the generated target trajectory. In this case, it is important to generate a target trajectory corresponding to a variety of vehicle deviation situations. However, technologies for satisfying this are not disclosed in the above PLTs 1 to 4.

The present invention was made against the above situation. The object of the present invention is to provide technologies for generating a target trajectory capable of corresponding to a variety of vehicle deviation situations.

Solution to Problem

The lane deviation suppressing system according to one aspect of the present invention calculates a target trajectory for causing a vehicle to travel to a target point, and then recalculates the target trajectory depending on a traveling state of the vehicle as the followings (1) to (5), for example. Note that the present system calculates the target trajectory to the target point using a polynomial of fifth or higher order with respect to time.

(1) The present system resets the target point and then calculates the target trajectory to the target point, if the vehicle traveling along the target trajectory returns to the target point after separating from the target point in an orthogonal direction orthogonal to an extending direction of the lane.

(2) The present system resets the target point and then calculates the target trajectory to the target point, if the vehicle traveling along the target trajectory starts to move toward the lane after deviating from the lane in the orthogonal direction.

(3) The present system resets the target point and then calculates the target trajectory to the target point, if a distance between an trajectory on which the vehicle travels in the orthogonal direction and the target trajectory is at a threshold value or more.

(4) The present system resets a point at which the vehicle will not contact the obstruction, as a target point, and then calculates the target trajectory to the target point, if the vehicle traveling along the target trajectory will contact an obstruction.

(5) The present system resets the target point, if a steering behavior of the vehicle traveling along the target trajectory exceeds the threshold value, and calculates the target trajectory so that the steering behavior of the vehicle does not exceed the threshold value during traveling on the target trajectory to the target point.

Note that in the above (1), in order to calculate the target trajectory, depending on the traveling state of the vehicle, the present system may select a polynomial of fifth or higher order with respect to time or a polynomial of first order with respect to time. If the polynomial of first order with respect to time is used, it may be used by calculating a lateral speed at which the vehicle moves in the orthogonal direction. In addition, the lateral speed may be calculated depending on a curvature of the lane.

In the above (2), if there is the obstruction, the present system may change the maximum deviation amount at which the vehicle traveling along the target trajectory most deviates from the lane in the orthogonal direction to reset the target point.

In the above (5), the present system may execute a behavior suppressing operation for suppressing the steering behavior of the vehicle, at the same time with a recalculation of the target trajectory or instead of a recalculation of the target trajectory. For example, as the behavior suppressing operation, the present system cancels a deviation suppressing operation for suppressing deviation of the vehicle from the lane, decelerates the vehicle, and reports that the steering behavior exceeds the threshold value to a driver, etc.

Therefore, the lane deviation suppressing system of the present invention can generate the target trajectory capable of corresponding to a variety of vehicle deviation situations.

DESCRIPTION OF THE EMBODIMENTS

Hereinafter, the embodiments of the present invention will be described with reference to the attached drawings. However, the present invention may be implemented in many different forms, and shall not be interpreted that it is limited to the embodiments described herein. Rather, these embodiments are provided, in order to disclose thoroughly and completely the present invention, and convey completely the scope of the present invention to those of ordinary skill in the art. Note that each of similar signs shows each of similar components throughout the drawings.

1. Explanation of the Configuration of the Lane Deviation Suppressing System

Figure 1A:
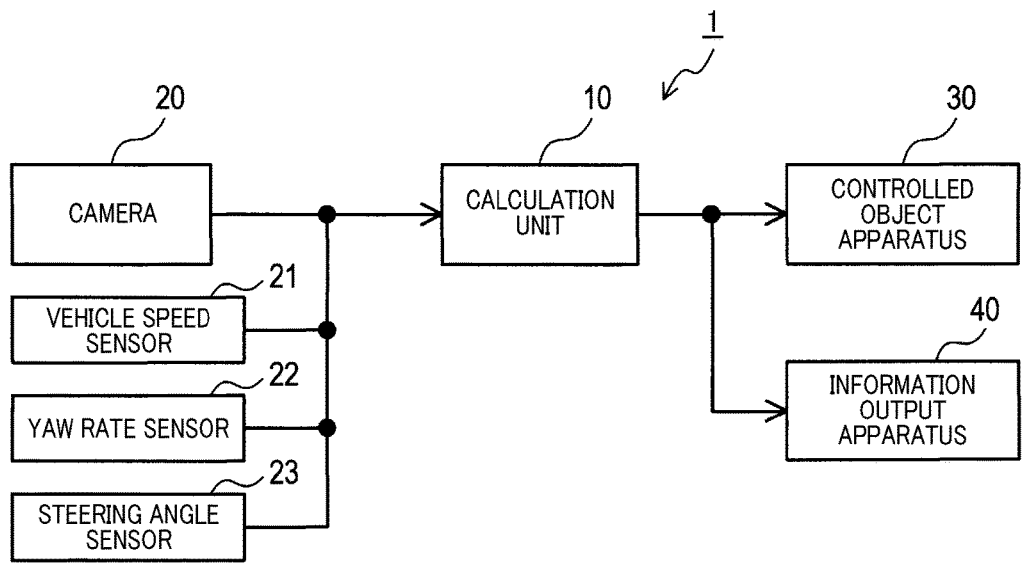
FIG. 1A is a block diagram illustrating an outline configuration of a lane deviation suppressing system 1.

A lane deviation suppressing system 1 as illustrated in FIG. 1A is a system that is mounted in a vehicle such as, for example, an automobile etc. and that performs control for suppressing deviation of an own vehicle from a lane during traveling. Note that the lane herein is a traveling region in a right and left white line (actual lane). Also, a vehicle, in which the lane deviation suppressing system 1 is mounted, is referred to as the own vehicle, herein.

In particular, the lane deviation suppressing system 1 comprises a calculation unit 10, a camera 20, a vehicle speed sensor 21, a yaw rate sensor 22, a steering angle sensor 23, a controlled object apparatus 30, and an information output apparatus 40.

The calculation unit 10 is configured as a widely known microcomputer comprising a Central Processing Unit (CPU), a Random Access Memory (RAM), a Read-Only Memory (ROM), and so on, and executes various types of processing such as the lane deviation suppressing processing for suppressing deviation of the vehicle from the lane during traveling in accordance with a program and so on stored in ROM. The lane deviation suppressing processing is described later. In addition, the calculation unit 10 generates a control command for causing the vehicle to travel along a target trajectory generated by the lane deviation suppressing processing, and then transmits the control command to the controlled object apparatus 30.

Figure 1B:
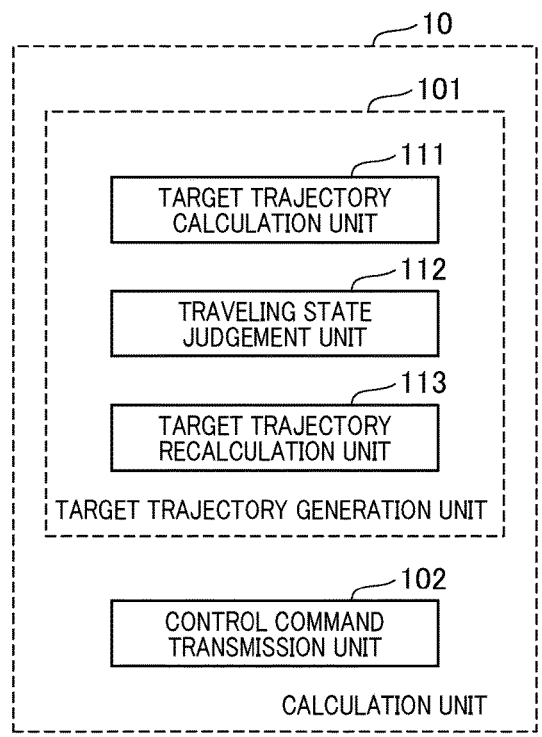
FIG. 1B is a functional block diagram of a calculation unit illustrated in FIG. 1A.

Note that the calculation unit 10 has a target trajectory generation unit 101 generating the target trajectory for causing the own vehicle to travel, and a control command transmission unit 102 generating and transmitting the control command for causing the own vehicle to travel along the target trajectory generated by the target trajectory generation unit 101, as a functional block as illustrated in FIG. 1B. In addition, the target trajectory generation unit 101 has a target trajectory calculation unit 111, a traveling state judgement unit 112, and a target trajectory recalculation unit 113. Functions of these functional blocks are referred in the descriptions of the after-mentioned lane deviation suppressing processing (1) to (7).

The camera 20 images a road surface in a traveling detection of the own vehicle, and detects a deviation angle representing an angle formed by the white line and a line in the traveling detection of the own vehicle, a distance to the white line, a curve radius, and so on, using a widely known white line recognition technology. The camera 20 sends these items of information to the calculation unit 10. Note that if the camera 20 comprises the function for obtaining an imaging image, the calculation unit 10 may calculate imaging information based on the imaging image.

The vehicle speed sensor 21 is configured as a vehicle speed sensor that detects a traveling speed of the own vehicle, and sends a detection result of the traveling speed to the calculation unit 10. In addition, the yaw rate sensor 22 is configured as a widely known yaw rate sensor that detects a rotation angle speed in a turning direction of the own vehicle, and sends a detection result of a yaw rate to the calculation unit 10. In addition, the steering angle sensor 23 is configured as a widely known steering angle sensor that detects a steering angle of the vehicle, and sends a detection result of the steering angle to the calculation unit 10.

The controlled object apparatus 30 is a controlled apparatus that is controlled by the calculation unit 10, and functions as a deviation suppressing operation unit that executes a deviation suppressing operation for suppressing deviation of the vehicle from the lane during traveling based on the control command transmitted from the calculation unit 10, specifically, the above control command transmission unit 102. The controlled apparatus in this embodiment includes a steering control apparatus that controls a steering mechanism, a drive control apparatus that controls a drive mechanism, and a braking control apparatus that controls a braking mechanism. The drive mechanism herein includes a drive force generation apparatus (for example, an internal-combustion engine or a motor) that generates a drive force of the own vehicle and a transmission system (for example, a transmission and so on) that transmits the drive force. The controlled object apparatus 30 further has a function as a part of the behavior suppressing operation unit that cancels an execution of the deviation suppressing operation by controlling the steering mechanism and that executes the behavior suppressing operation for decelerating the vehicle by controlling the drive mechanism or the braking mechanism, for example.

The information output apparatus 40 is an apparatus that reports information to be sent from the calculation unit 10. The information output apparatus 40 includes a display apparatus that displays information and a voice output apparatus that outputs information by voice. As described later, the information output apparatus 40 has the function as a part of the behavior suppressing operation unit that executes the behavior suppressing operation.

2. Explanation of the Lane Deviation Suppressing Processing

Next, lane deviation suppressing processing (1) to (7) that executed by the calculation unit 10 of the lane deviation suppressing system 1, are described.

The lane deviation suppressing processing is processing for suppressing deviation of the vehicle from the lane during traveling. The lane deviation suppressing processing starts, for example, when the power to the lane deviation suppressing system 1 is turned on. After that, the processing is executed repeatedly for each constant time (for example, for each 50 ms).

2.1. Explanation of the Lane Deviation Suppressing Processing (1)

Figure 2:
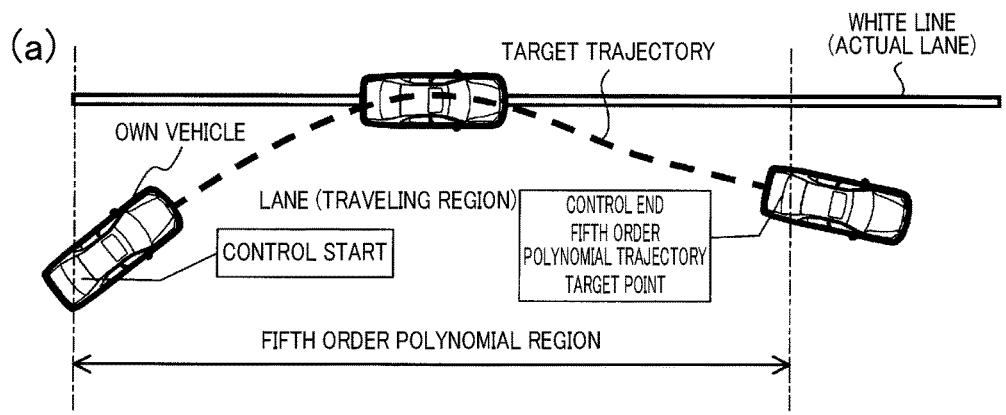
FIG. 2 is an illustration diagram relating to a lane deviating suppressing processing (1).
Figure 2:
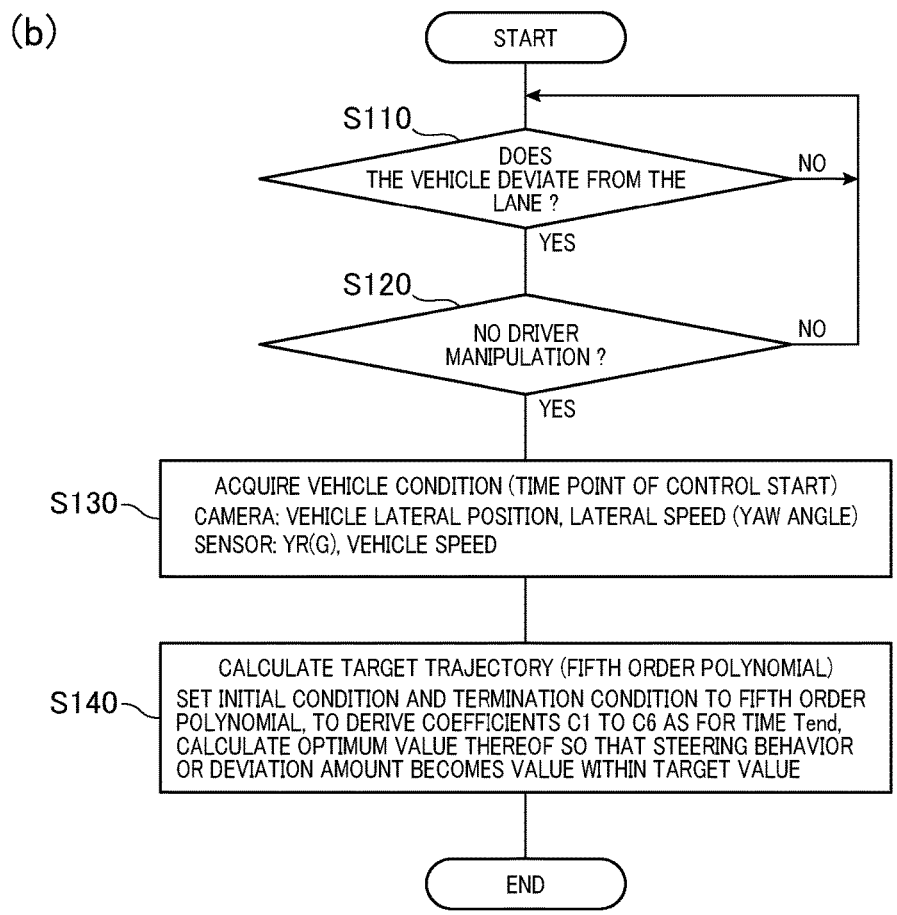

Firstly, the lane deviating suppressing processing (6) is explained with reference to FIG. 2. FIG. 2 (*a*) is an illustration diagram illustrating the lane deviation suppressing processing (1). FIG. 2 (*b*) is a flowchart illustrating the lane deviation suppressing processing (1).

At first step S110, the calculation unit 10 judges whether or not the vehicle deviates from the lane. In particular, the calculation unit 10 determines whether or not the vehicle deviates from the lane (traveling region) with a criterion time (for example, two seconds). In this processing, the calculation unit 10 calculates a time until the own vehicle arrives at an actual lane, based on a deviation angle obtained as imaging information, an distance to the actual lane, and a traveling speed of the own vehicle, and determines whether or not the time is within the criterion time. At step S110, if the calculation unit 10 judges that the vehicle does not deviate from the lane within the criterion time, it executes step S110 again. On the other hand, at step S110, if the calculation unit 10 judges that the vehicle deviates from the lane within the criterion time, the processing flow proceeds to step S120.

At step S120, the present system determines whether or not there is a manipulation by a driver. Herein, "manipulation by the driver" represents a manipulation for changing a direction of the steering to a direction away from the approaching actual lane. The present system detects whether there is a manipulation by monitoring the detection result by the steering angle sensor 23.

At step S120, if there is the manipulation by the driver, the processing flow proceeds to step S110. On the other hand, at step S120, if there is no manipulation by the driver, the processing flow proceeds to step S130.

At step S130, the calculation unit 10 acquires a vehicle condition at a control start point. In particular, the calculation unit 10 calculates a position and a speed in a lateral direction of the own vehicle, based on the deviation angle obtained as the imaging information, the distance to the actual lane, and the traveling speed of the own vehicle. The calculation unit 10 acquires the traveling speed of the own vehicle from the vehicle speed sensor 21 and acquires the yaw rate from the yaw rate sensor 22. After that, the processing flow proceeds to step S140.

At step S140, the calculation unit 10 calculates the target trajectory. The target trajectory is obtained using the polynomial of fifth order with respect to time t as the following formulas. Ay is an acceleration (acceleration in the lateral direction), Vy is a lateral speed (speed in the lateral direction), and Y is a lateral position (position in the lateral direction). The calculation unit 10 sets an initial condition and a termination condition to each formula, to derive coefficients C1 to C6. The initial condition is a condition to be set at a time point of a control start. In addition, the termination condition is a condition to be set at a time point of a control end. A point, at which the vehicle is located at the time point of the control end, is set as the target point. As for a time Tend, an optimum value thereof is calculated so that a steering behavior or a deviation amount becomes a value within a target value. Note that, instead of the polynomial of fifth order with respect to time, the calculation unit 10 may calculate the target trajectory using a polynomial of sixth or higher order with respect to time. After that, this processing ends.

In the lane deviation suppressing processing (1), at step S140, the target trajectory calculation unit 111 in the calculation unit 10 executes the processing.

Fifth Order Polynomial Target Object $A_y$: Acceleration, $V_y$: Lateral Speed, Y: Lateral position $$A_y = C_1 t^3 + C_2 t^2 + C_3 t + C_4$$

$$V_y = \tfrac{1}{4} C_1 t^4 + \tfrac{1}{3} C_2 t^3 + \tfrac{1}{2} C_3 t^2 + C_4 t + C_5$$

$$Y = \tfrac{1}{20} C_1 t^5 + \tfrac{1}{12} C_2 t^4 + \tfrac{1}{6} C_3 t^3 + \tfrac{1}{2} C_4 t^2 + C_5 t + C_6 \quad \text{[Math. 1]}$$

Initial Condition (Time Point of Control Start), Termination Condition (Time Point of Control End)

$t=0 \quad t=T_{end}$
$A_y = a_0 \quad A_y = a_{end}$
$V_y = v_0 \quad V_y = v_{end}$
$Y = y_0 \quad Y = y_{end}$ 2.2. Explanation of the Lane Deviation Suppressing Processing (2)

Figure 3:
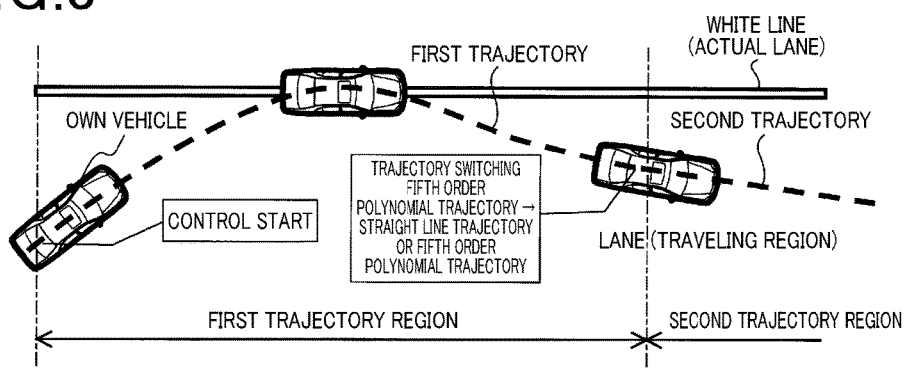
FIG. 3 is an illustration diagram relating to a lane deviating suppressing processing (2).
Figure 3:
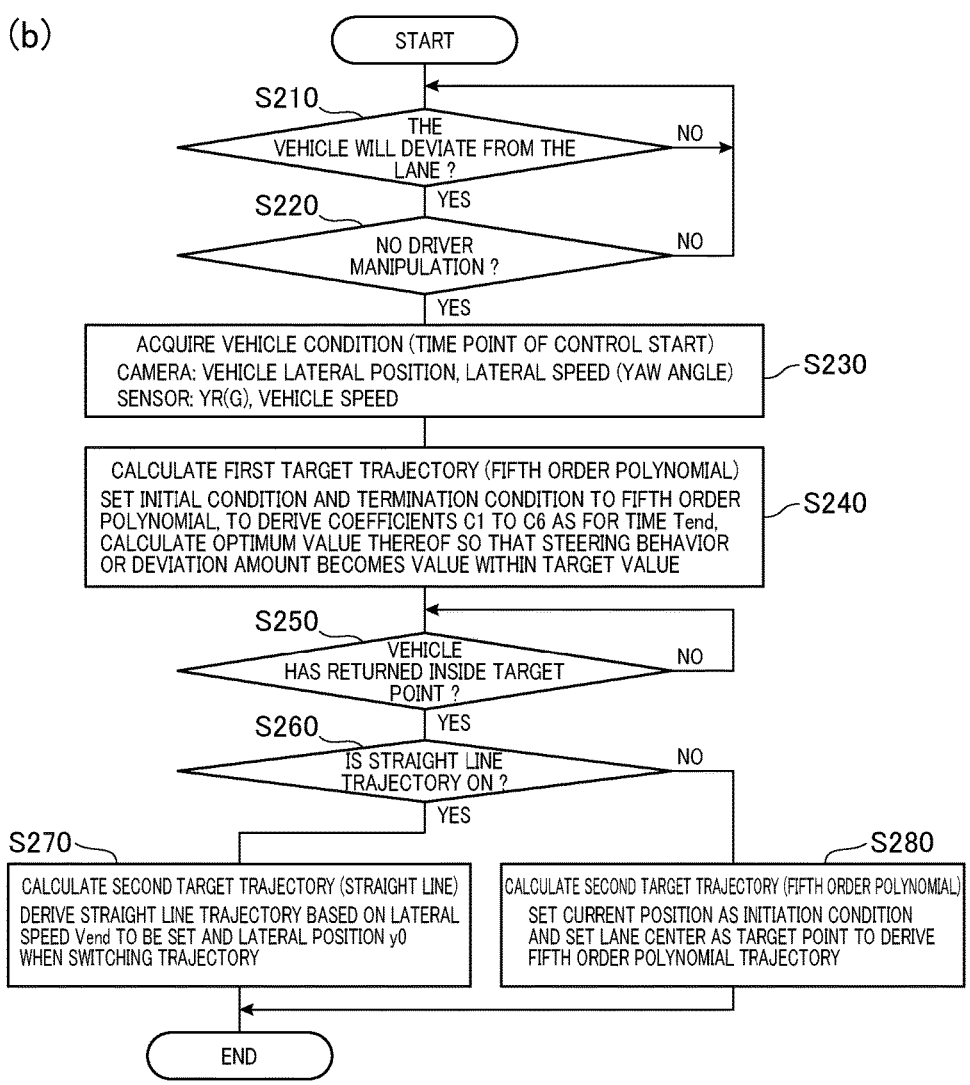

Next, the lane deviating suppressing processing (2) is explained with reference to FIG. 3. FIG. 3 (a) is an illustration diagram illustrating the lane deviation suppressing processing (2). FIG. 3 (b) is a flowchart illustrating the lane deviation suppressing processing (2).

At first step S210, the calculation unit 10 judges whether or not the vehicle deviates from the lane. Since this processing is similar to step S110 of the lane deviation suppressing processing (1), detailed description is omitted, here. At step S210, if the calculation unit 10 judges that the vehicle does not deviate from the lane within the criterion time, it executes step S210 again. On the other hand, at step S210, if the calculation unit 10 judges that the vehicle deviates from the lane within the criterion time, the processing flow proceeds to step S220.

At step S220, the calculation unit 10 determines whether or not there is manipulation by a driver. Since this processing is similar to step S120 of the lane deviation suppressing processing (1), detailed description is omitted, here. At step S220, if there is the manipulation by the driver, the processing flow proceeds to step S210. On the other hand, at step S220, if there is no manipulation by the driver, the processing flow proceeds to step S230.

At step S230, the calculation unit 10 acquires a vehicle condition at a control start point. Since this processing is similar to step S130 of the lane deviation suppressing processing (1), detailed description is omitted, here. At this step S230, the calculation unit 10 acquires a curvature of the lane on which the vehicle travels, as the vehicle condition. After that, the processing flow proceeds to step S240.

At step S240, the calculation unit 10 calculates a first target trajectory. The first target trajectory is obtained using the polynomial of fifth order with respect to time t as the following formulas. Ay is an acceleration (acceleration in the lateral direction), Vy is a lateral speed (speed in the lateral direction), and Y is a lateral position (position in the lateral direction). The calculation unit 10 sets an initial condition and a termination condition to each formula, to derive coefficients C1 to C6. The initial condition is a condition to be set at a time point of a control start. In addition, the termination condition is a condition to be set at a time point of a control end. A point, at which the vehicle is located at the time point of the control end, is set as the target point. As for a time Tend, an optimum value thereof is calculated so that a steering behavior or a deviation amount becomes a value within a target value. Note that, instead of the fifth order polynomial, the calculation unit 10 may calculate the target trajectory using the sixth or higher order polynomial. After that, the processing flow proceeds to step S250.

Fifth Order Polynomial Target Object $A_y$: Acceleration, $V_y$: Lateral Speed, Y: Lateral position $$A_y = C_1 t^3 + C_2 t^2 + C_3 t + C_4$$

$$V_y = \tfrac{1}{4} C_1 t^4 + \tfrac{1}{3} C_2 t^3 + \tfrac{1}{2} C_3 t^2 + C_4 t + C_5$$

$$Y = \tfrac{1}{20} C_1 t^5 + \tfrac{1}{12} C_2 t^4 + \tfrac{1}{6} C_3 t^3 + \tfrac{1}{2} C_4 t^2 + C_5 t + C_6 \quad \text{[Math. 2]}$$

Initial Condition (Time Point of Control Start), Termination Condition (Time Point of Control End)

$t=0 \quad t=T_{end}$
$A_y=a_0 \quad A_y=a_{end}$
$V_y=v_0 \quad V_y=v_{end}$
$Y=y_0 \quad Y=y_{end}$ At the first step S250, the calculation unit 10 judges whether or not the vehicle returns inside the target point. In this step, the calculation unit 10 judges that the vehicle returns inside the target point, if the vehicle traveling along the target trajectory returns to the target point after separating from the target point in the orthogonal direction orthogonal to the extending direction of the lane. At step S250, if the calculation unit 10 judges that the vehicle does not return inside the target point, the calculation unit 10 judges that the recalculation of the target trajectory is unnecessary and then executes step S250 again. On the other hand, at step S250, if the calculation unit 10 judges that the vehicle returns inside the target point, the calculation unit 10 judges that the recalculation of the target trajectory is necessary and then the processing flow proceeds to step S260.

At step S260, the calculation unit 10 judges whether or not a straight line trajectory flag is ON. Note that, as for the straight line trajectory flag, ON/OFF switching can be performed depending on the traveling state of the vehicle. If the straight line trajectory flag is ON, it is indicated that the straight line trajectory is suitable as a target trajectory after the recalculation. If the straight line trajectory flag is OFF, it is indicated that the straight line trajectory is not suitable as a target trajectory after the recalculation. At step S260, if the straight line trajectory flag is ON, the processing flow proceeds to step S270. On the other hand, at step S260, if the straight line trajectory flag is not ON, the processing flow proceeds to step S280.

At step S270, the calculation unit 10 calculates a second target trajectory, in response to the judgement that the straight line trajectory flag is ON. The second target trajectory is obtained using the polynomial of first order with respect to time t as the following formulas. Ay is an acceleration (acceleration in the lateral direction). Vy is a lateral speed (speed in the lateral direction), and Y is a lateral position (position in the lateral direction). Note that as the initial condition, a lateral speed Vend and a lateral position Y0 at the time point of switching the trajectory are used. The lateral speed Vend is calculated depending on a curvature of the lane on which the vehicle travels. As the result, the second target trajectory is the straight line trajectory. In this manner, the initial condition and the termination condition are reset, and then the target trajectory is recalculated. After that, this processing ends.

Straight Line Target Trajectory
$A_y$: Acceleration, $V_y$: Lateral Speed, Y: Lateral position $$Y=y_0+v_{end}t$$

$$V_y=v_{end}$$

$$A_y=0 \quad \quad \text{[Math. 3]}$$

At step S280, the calculation unit 10 calculates the second target trajectory, in response to the judgement that the straight line trajectory flag is not ON. The second target trajectory is obtained using the polynomial of fifth order with respect to time t as the following formulas. Ay is an acceleration (acceleration in the lateral direction), Vy is a lateral speed (speed in the lateral direction), and Y is a lateral position (position in the lateral direction). The calculation unit 10 sets an initial condition and a termination condition for each formula, to derive coefficients C1 to C6. Note that the calculation unit 10 sets a current vehicle position as the initial condition (start condition) and sets a lane center as the termination condition. The lane center is set as the target point. In this manner, the initial condition and the termination condition are reset, and then the target trajectory is recalculated. Note that, instead of the fifth order polynomial, the calculation unit 10 may calculate the target trajectory using the sixth or higher order polynomial. After that, this processing ends.

In the lane deviation suppressing processing (2), at step S240, the target trajectory calculation unit 111 in the calculation unit 10 executes the processing. At step S250, the traveling state judgement unit 112 executes the processing. At steps S260, S270, S280, the target trajectory recalculation unit 113 executes the processing.

Fifth Order Polynomial Target Object
$A_y$: Acceleration, $V_y$: Lateral Speed, Y: Lateral position $$A_y=C_1t^3+C_2t^2+C_3t+C_4$$

$$V_y=\tfrac{1}{4}C_1t^4+\tfrac{1}{3}C_2t^3+\tfrac{1}{2}C_3t^2+C_4t+C_5$$

$$Y=\tfrac{1}{20}C_1t^5+\tfrac{1}{12}C_2t^4+\tfrac{1}{6}C_3t^3+\tfrac{1}{2}C_4t^2+C_5t+C_6 \quad \text{[Math. 4]}$$

Initial Condition (Time Point of Control Start), Termination Condition (Time Point of Control End)

$t=0 \quad t=T_{end}$
$A_y=a_0 \quad A_y=a_{end}$
$V_y=v_0 \quad V_y=v_{end}$
$Y=y_0 \quad Y=y_{end}$ 2.3. Explanation of the Lane Deviation Suppressing Processing (3)

Figure 4:
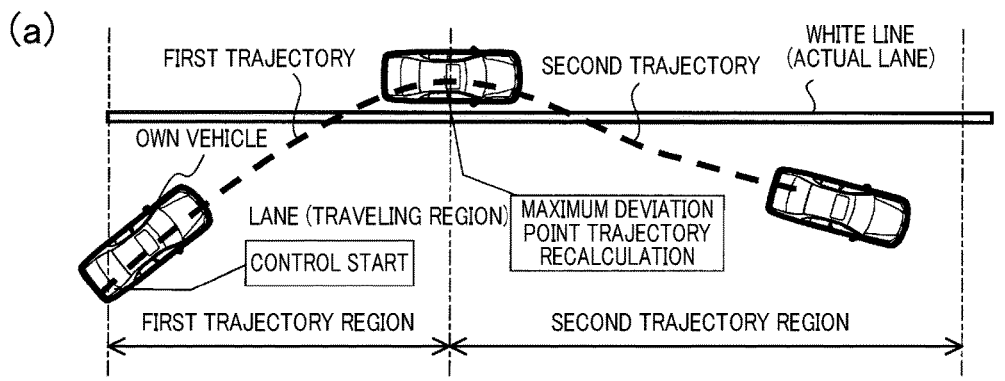
FIG. 4 is an illustration diagram relating to a lane deviating suppressing processing (3).
Figure 4:
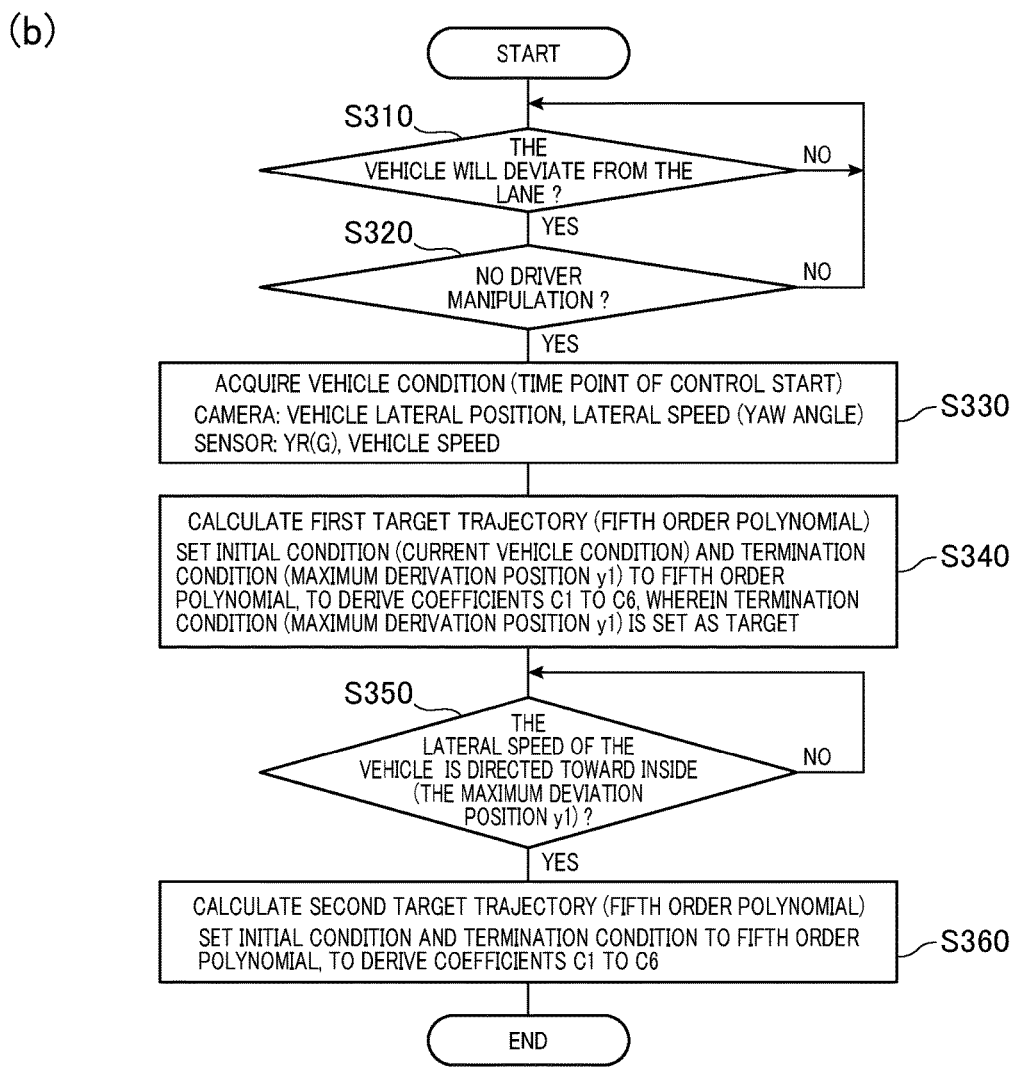

Next, the lane deviating suppressing processing (3) is explained with reference to FIG. 4. FIG. 4 (a) is an illustration diagram illustrating the lane deviation suppressing processing (3). FIG. 4 (b) is a flowchart illustrating the lane deviation suppressing processing (3).

At first step S310, the calculation unit 10 judges whether or not the vehicle deviates from the lane. Since this processing is similar to step S110 of the lane deviation suppressing processing (1), detailed description is omitted, here. At step S310, if the calculation unit 10 judges that the vehicle does not deviate from the lane within the criterion time, it executes step S310 again. On the other hand, at step S310, if the calculation unit 10 judges that the vehicle deviates from the lane within the criterion time, the processing flow proceeds to step S320.

At step S320, the calculation unit 10 determines whether or not there is manipulation by a driver. Since this processing is similar to step S120 of the lane deviation suppressing processing (1), detailed description is omitted, here. At step S320, if there is the manipulation by the driver, the processing flow proceeds to step S310. On the other hand, at step S220, if there is no manipulation by the driver, the processing flow proceeds to step S330.

At step S330, the calculation unit 10 acquires a vehicle condition at a control start point. Since this processing is similar to step S130 of the lane deviation suppressing processing (1), detailed description is omitted, here. After that, the processing flow proceeds to step S340.

At step S340, the calculation unit 10 calculates a first target trajectory. The first target trajectory is obtained using the polynomial of fifth order with respect to time t as the following formulas. Ay is an acceleration (acceleration in the lateral direction), Vy is a lateral speed (speed in the lateral direction), and Y is a lateral position (position in the lateral direction). The calculation unit 10 sets an initial condition and a termination condition to each formula, to derive coefficients C1 to C6. The calculation unit 10 sets a current vehicle condition in the initial condition and sets a maximum deviation position Y1 in the termination condition. The maximum deviation position Y1 is a point at which the vehicle most deviates from the lane during traveling. The maximum deviation position Y1 is set as the target point. Note that, instead of the fifth order polynomial, the calculation unit 10 may calculate the target trajectory using the sixth or higher order polynomial. After that, the processing flow proceeds to step S350.

Fifth Order Polynomial Target Object (First and Second Trajectories in Common)

$A_y$: Acceleration, $V_y$: Lateral Speed, Y: Lateral position $$A_y = C_1 t^3 + C_2 t^2 + C_3 t + C_4$$

$$V_y = \tfrac{1}{4} C_1 t^4 + \tfrac{1}{3} C_2 t^3 + \tfrac{1}{2} C_3 t^2 + C_4 t + C_5$$

$$Y = \tfrac{1}{20} C_1 t^5 + \tfrac{1}{12} C_2 t^4 + \tfrac{1}{6} C_3 t^3 + \tfrac{1}{2} C_4 t^2 + C_5 t + C_6 \qquad \text{[Math. 5]}$$

First Trajectory—Initial Condition, Termination Condition

Maximum deviation position Y1 can be set $t_1 = 0 \quad t_1 = T_1$
$A_{1y} = a_0 \quad A_{1y} = a_1$
$V_{1y} = v_0 \quad V_{1y} = 0$
$Y_1 = y_0 \quad Y = y_1$ At step S350, the calculation unit 10 judges whether or not the lateral speed of the vehicle is directed toward an inside of the maximum deviation position Y1. In this step, the calculation unit 10 judges that the lateral speed of the vehicle is directed toward thereinside if the vehicle traveling along the target trajectory moves toward the lane after deviating from the lane in the orthogonal direction orthogonal to the extending direction of the lane. At step S350, if the calculation unit 10 judges that the lateral speed of the vehicle is not directed toward thereinside, the calculation unit 10 judges that the recalculation of the target trajectory is unnecessary and then executes step S350 again. On the other hand, at step S350, if the calculation unit 10 judges that the lateral speed of the vehicle is directed toward thereinside, the calculation unit 10 judges that the recalculation of the target trajectory is necessary and then the processing flow proceeds to step S360. Note that at the above step S350, if there is an obstruction in a direction where the vehicle traveling along the target trajectory deviates from the target trajectory, the calculation unit 10 judges that the recalculation of the target trajectory is necessary and then the processing flow proceeds to step S360.

At step S360, a second target trajectory is calculated. The second target trajectory is obtained using the polynomial of fifth order with respect to time t as above formula. Ay is an acceleration (acceleration in the lateral direction). Vy is a lateral speed (speed in the lateral direction), and Y is a lateral position (position in the lateral direction). The calculation unit 10 sets an initial condition and a termination condition as follows to each formula, to derive coefficients C1 to C6. The initial condition is a condition to be set at a time point of a control start. In addition, the termination condition is a condition to be set at a time point of a control end. A point, at which the vehicle is located at the time point of the control end, is set as the target point. Note that at the above step S350, if the present system judges that the recalculation of the target trajectory is necessary due to the presence of the obstruction, it changes a distance between the lane on which the vehicle travels in the orthogonal direction and the maximum deviation point to reset the time point of the control end as the target point. In this manner, the initial condition and the termination condition are reset, and then the target trajectory is recalculated. Note that, instead of the fifth order polynomial, the present system may calculate the target trajectory using the sixth or higher order polynomial. After that, this processing ends.

In the lane deviation suppressing processing (3), at step S340, the target trajectory calculation unit 111 in the calculation unit 10 executes the processing. At step S350, the traveling state judgement unit 112 executes the processing. At step S360, the target trajectory recalculation unit 113 executes the processing.

Fifth Order Polynomial Target Object (First and Second Trajectories in Common)

$$A_y = C_1 t^3 + C_2 t^2 + C_3 t + C_4$$

$$V_y = \tfrac{1}{4} C_1 t^4 + \tfrac{1}{3} C_2 t^3 + \tfrac{1}{2} C_3 t^2 + C_4 t + C_5$$

$$Y = \tfrac{1}{20} C_1 t^5 + \tfrac{1}{12} C_2 t^4 + \tfrac{1}{6} C_3 t^3 + \tfrac{1}{2} C_4 t^2 + C_5 t + C_6 \qquad \text{[Math. 6]}$$

Second Trajectory—Initial Condition, Termination Condition $t_2 = 0 \quad t_2 = T_{end}$
$A_{2y} = a_2 \quad A_{2y} = a_{end}$
$V_{2y} = 0 \quad V_{2y} = v_{end}$
$Y_2 = y_2 \quad Y_2 = y_{end}$ 2.4. Explanation of the Lane Deviation Suppressing Processing (4)

Figure 5:
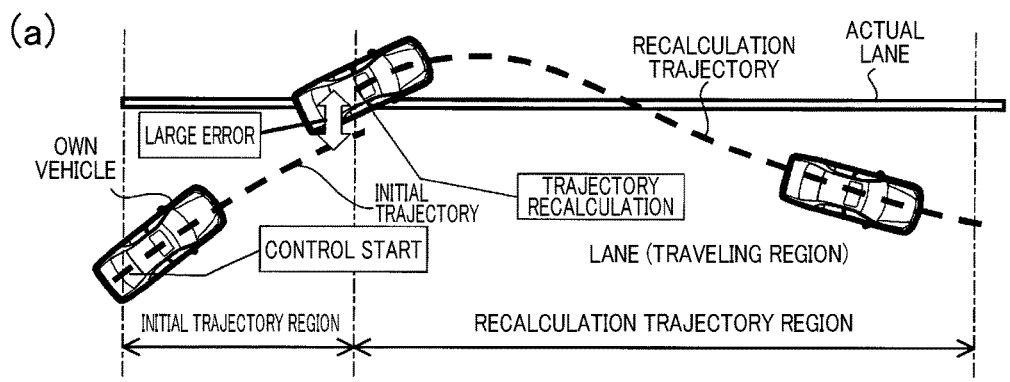
FIG. 5 is an illustration diagram relating to a lane deviating suppressing processing (4).
Figure 5:
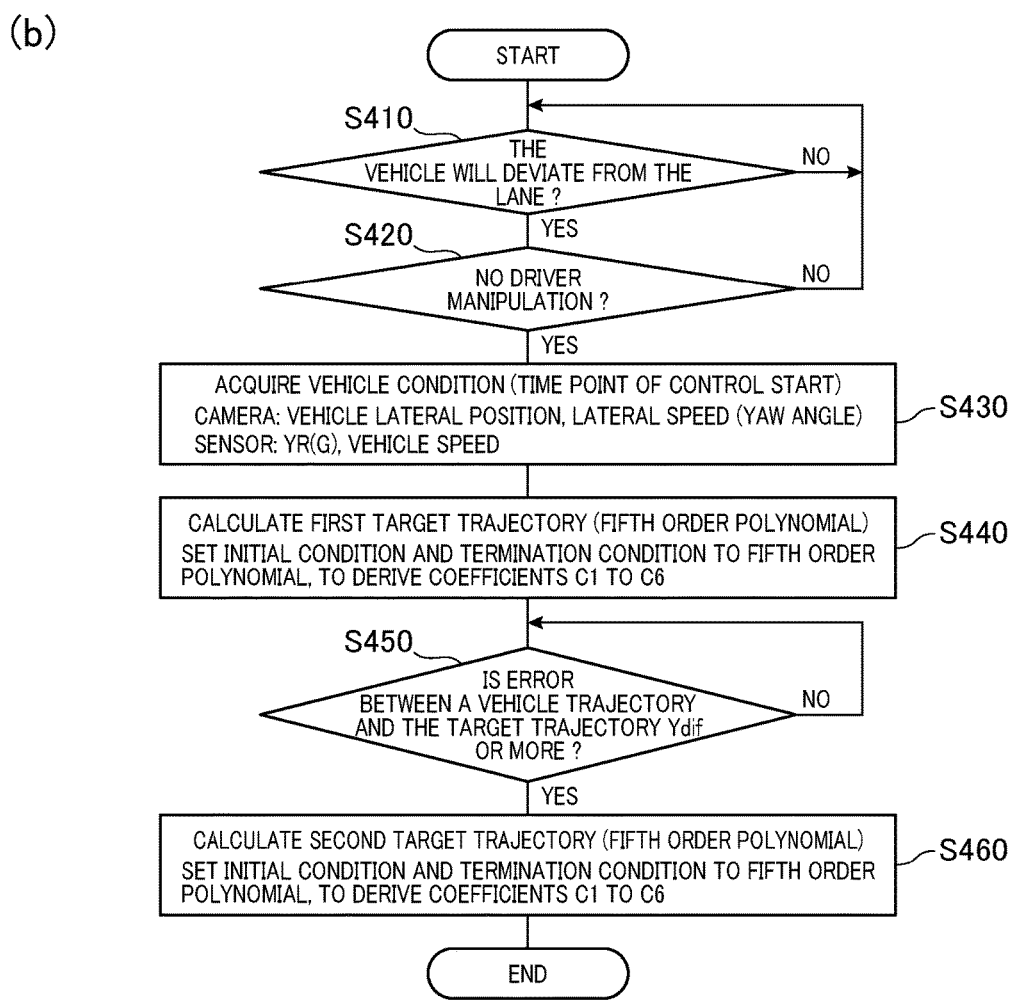

Next, the lane deviating suppressing processing (4) is explained with reference to FIG. 5. FIG. 5 (a) is an illustration diagram illustrating the lane deviation suppressing processing (4). FIG. 5 (b) is a flowchart illustrating the lane deviation suppressing processing (4).

At first step S410, the calculation unit 10 judges whether or not the vehicle deviates from the lane. Since this processing is similar to step S110 of the lane deviation suppressing processing (1), detailed description is omitted, here. At step S410, if the calculation unit 10 judges that the vehicle does not deviate from the lane within the criterion time, it executes step S410 again. On the other hand, at step S410, if the calculation unit 10 judges that the vehicle deviates from the lane within the criterion time, the processing flow proceeds to step S420.

At step S420, the calculation unit 10 determines whether or not there is a manipulation by a driver. Since this processing is similar to step S120 of the lane deviation suppressing processing (1), detailed description is omitted, here. At step S420, if there is the manipulation by the driver, the processing flow proceeds to step S410. On the other hand, at step S420, if there is no manipulation by the driver, the processing flow proceeds to step S430.

At step S430, the calculation unit 10 acquires a vehicle condition at a control start point. Since this processing is similar to step S130 of the lane deviation suppressing processing (1), detailed description is omitted, here. After that, the processing flow proceeds to step S440.

At step S440, the calculation unit 10 calculates a first target trajectory. The first target trajectory is obtained using the polynomial of fifth order with respect to time t as the following formulas. Ay is an acceleration (acceleration in the lateral direction), Vy is a lateral speed (speed in the lateral direction), and Y is a lateral position (position in the lateral direction). The calculation unit 10 sets an initial condition and a termination condition to each formula, to derive coefficients C1 to C6. The initial condition is a condition to be set at a time point of a control start. In addition, the termination condition is a condition to be set at a time point of a control end. A point, at which the vehicle is located at the time point of the control end, is set as the target point. The calculation unit 10 can also set the maximum deviation position Y1 in the termination condition. Note that, instead of the fifth order polynomial, the calculation unit 10 may calculate the target trajectory using the sixth or higher order polynomial. After that, the processing flow proceeds to step S450.

Fifth Order Polynomial Target Object (First and Second Trajectories in Common)

$A_y$: Acceleration, $V_y$: Lateral Speed, Y: Lateral position $$A_y = C_1 t^3 + C_2 t^2 + C_3 t + C_4$$

$$V_y = \tfrac{1}{4} C_1 t^4 + \tfrac{1}{3} C_2 t^3 + \tfrac{1}{2} C_3 t^2 + C_4 t + C_5$$

$$Y = \tfrac{1}{20} C_1 t^5 + \tfrac{1}{12} C_2 t^4 + \tfrac{1}{6} C_3 t^3 + \tfrac{1}{2} C_4 t^2 + C_5 t + C_6 \qquad \text{[Math. 7]}$$

First Trajectory—Initial Condition, Termination Condition Maximum deviation position Y1 can be set
$t_1 = 0 \; t_1 = T_1$
$A_{1y} = a_0 \; A_{1y} = a_1$
$V_{1y} = v_0 \; V_{1y} = v_1$
$Y_1 = y_0 \; Y = y_1$ At step S450, the calculation unit 10 judges whether or not an error between a vehicle trajectory and the target trajectory is Ydif or more. In particular, the calculation unit 10 judges whether or not a distance between the trajectory on which the vehicle travels in the orthogonal direction orthogonal to the extending direction of the lane and the target trajectory is at the threshold value (Ydif) or more. At step S450, if the calculation unit 10 judges that the error between the vehicle trajectory and the target trajectory is not Ydif or more, the calculation unit 10 judges that the recalculation of the target trajectory is unnecessary and then the calculation unit 10 proceeds to step S450 again. On the other hand, at step S450, if the calculation unit 10 judges that the error between the vehicle trajectory and the target trajectory is Ydif or more, the calculation unit 10 judges that the recalculation of the target trajectory is necessary and then the processing flow proceeds to step S460.

At step S460, the calculation unit 10 calculates a second target trajectory. The second target trajectory is obtained using the polynomial of fifth order with respect to time t as the following formulas. Ay is an acceleration (acceleration in the lateral direction), Vy is a lateral speed (speed in the lateral direction), and Y is a lateral position (position in the lateral direction). The calculation unit 10 sets an initial condition and a termination condition as follows to each formula, to derive coefficients C1 to C6. The initial condition is a condition to be set at a time point of a control start. In addition, the termination condition is a condition to be set at a time point of a control end. A point, at which the vehicle is located at the time point of the control end, is set as the target point. In this manner, the initial condition and the termination condition are reset, and then the target trajectory is recalculated. Note that, instead of the fifth order polynomial, the calculation unit 10 may calculate the target trajectory using the sixth or higher order polynomial. After that, this processing ends.

In the lane deviation suppressing processing (4), at step S440, the target trajectory calculation unit 111 in the calculation unit 10 executes the processing. At step S450, the traveling state judgement unit 112 executes the processing. At step S460, the target trajectory recalculation unit 113 executes the processing.

Fifth Order Polynomial Target Object (First and Second Trajectories in Common)

$A_y$: Acceleration, $V_y$: Lateral Speed, Y: Lateral position $$A_y = C_1 t^3 + C_2 t^2 + C_3 t + C_4$$

$$V_y = \tfrac{1}{4} C_1 t^4 + \tfrac{1}{3} C_2 t^3 + \tfrac{1}{2} C_3 t^2 + C_4 t + C_5$$

$$Y = \tfrac{1}{20} C_1 t^5 + \tfrac{1}{12} C_2 t^4 + \tfrac{1}{6} C_3 t^3 + \tfrac{1}{2} C_4 t^2 + C_5 t + C_6 \qquad \text{[Math. 8]}$$

Second Trajectory—Initial Condition, Termination Condition
$t_2 = 0 \; t_2 = T_{end}$
$A_{2y} = a_2 \; A_{2y} = a_{end}$
$V_{2y} = v_2 \; V_{2y} = v_{end}$
$Y_2 = y_2 \; Y = y_{end}$ 2.5. Explanation of the Lane Deviation Suppressing Processing (5)

Figure 6:
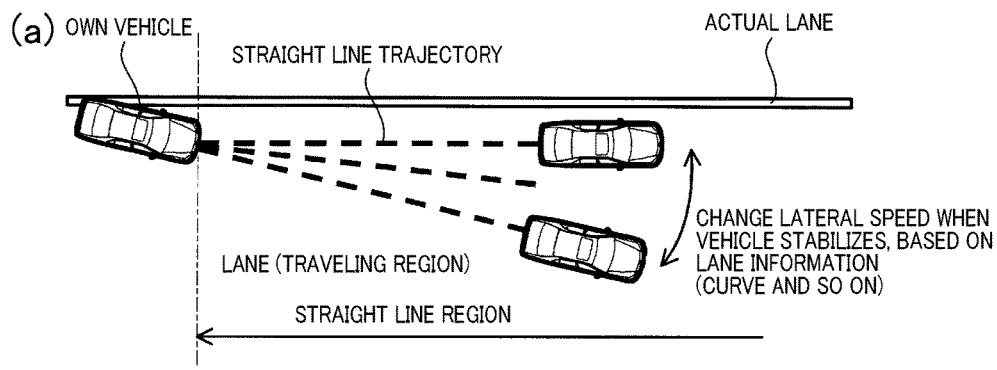
FIG. 6 is an illustration diagram relating to a lane deviating suppressing processing (5).
Figure 6:
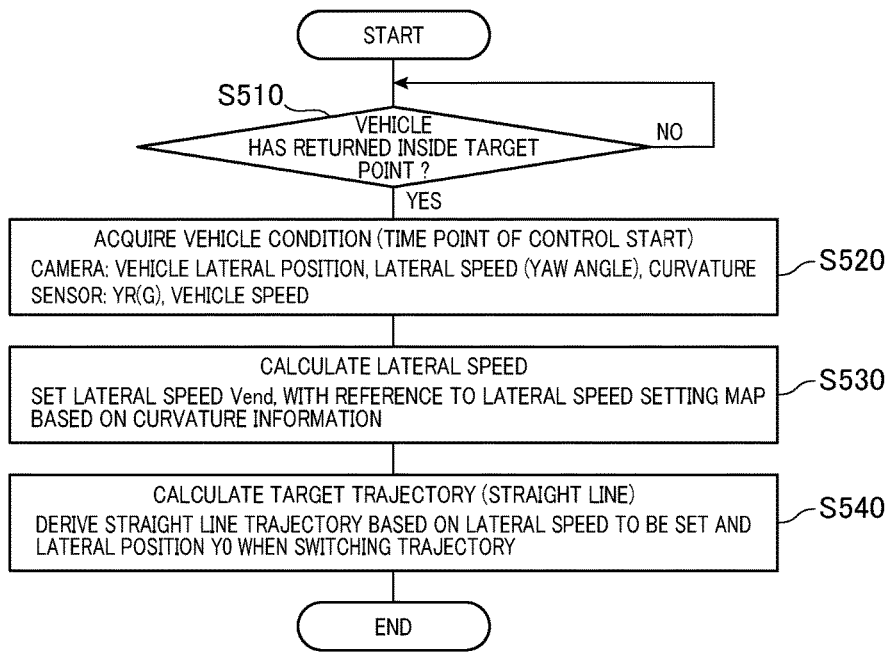
Figure 6:
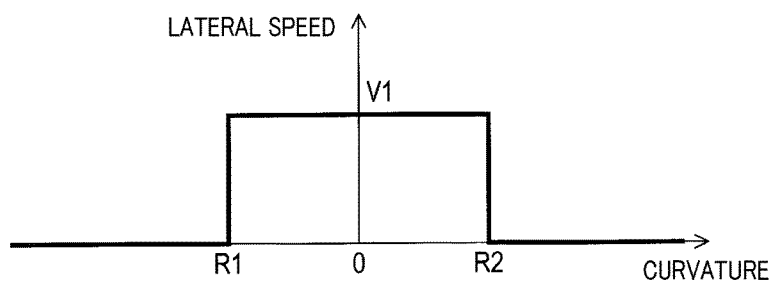

Next, the lane deviating suppressing processing (5) is explained with reference to FIG. 6. FIG. 6 (a) is an illustration diagram illustrating the lane deviation suppressing processing (5). FIG. 6 (b) is a flowchart illustrating the lane deviation suppressing processing (5).

This lane deviation suppressing processing (5) is executed when the vehicle travels along the calculated target trajectory. At first step S510, the calculation unit 10 judges whether or not the vehicle returns inside the target point. Since this processing is similar to step S250 of the lane deviation suppressing processing (2), detailed description is omitted, here.

At step S510, if the calculation unit 10 judges that the vehicle does not return inside the target point, the calculation unit 10 judges that the recalculation of the target trajectory is unnecessary and then executes step S510 again. On the other hand, at step S510, if the calculation unit 10 judges that the vehicle returns inside the target point, the calculation unit 10 judges that the recalculation of the target trajectory is necessary and then the processing flow proceeds to step S520.

At step S520, the calculation unit 10 acquires a vehicle condition at a control start point. Since this processing is similar to step S130 of the lane deviation suppressing processing (1), detailed description is omitted, here. After that, the processing flow proceeds to step S530.

At step S530, the calculation unit 10 calculates the lateral speed. In this step, as for the lateral speed Vend, a value depending on a curvature of the lane on which the vehicle travels, is selected, with reference to a lateral speed setting MAP illustrated in the FIG. 6 (c). The curvature of the lane is calculated based on a coordinate of the right and left white line to be detected. For example, if the curvature of the lane on which the vehicle travels is a value between R1 (negative value) and R2 (positive value), the calculation unit 10 sets the lateral speed Vend to V1 (positive value). If the curvature of the lane on which the vehicle travels is a value smaller than R1 (negative value) or is a value greater than R2 (positive value), the calculation unit 10 sets the lateral speed Vend to the value 0. After that, the processing flow proceeds to step S540.

At step S540, the calculation unit 10 calculates the target trajectory. The target trajectory is obtained using the polynomial of first order with respect to time t as the following formulas. Ay is an acceleration (acceleration in the lateral direction), Vy is a lateral speed (speed in the lateral direction), and Y is a lateral position (position in the lateral direction). Note that as the initial condition, the lateral speed Vend to be set at step S530 and a lateral position Y0 at the time point of switching the trajectory are used. As the result, the target trajectory is the straight line trajectory. After that, this processing ends.

Straight Line Target Trajectory $A_y$: Acceleration, $V_y$: Lateral Speed, Y: Lateral position $$Y = y_0 + v_{end} t$$

$$V_y = v_{end}$$

$$A_y = 0 \quad \text{[Math. 9]}$$

2.6. Explanation of the Lane Deviation Suppressing Processing (6)

Figure 7:
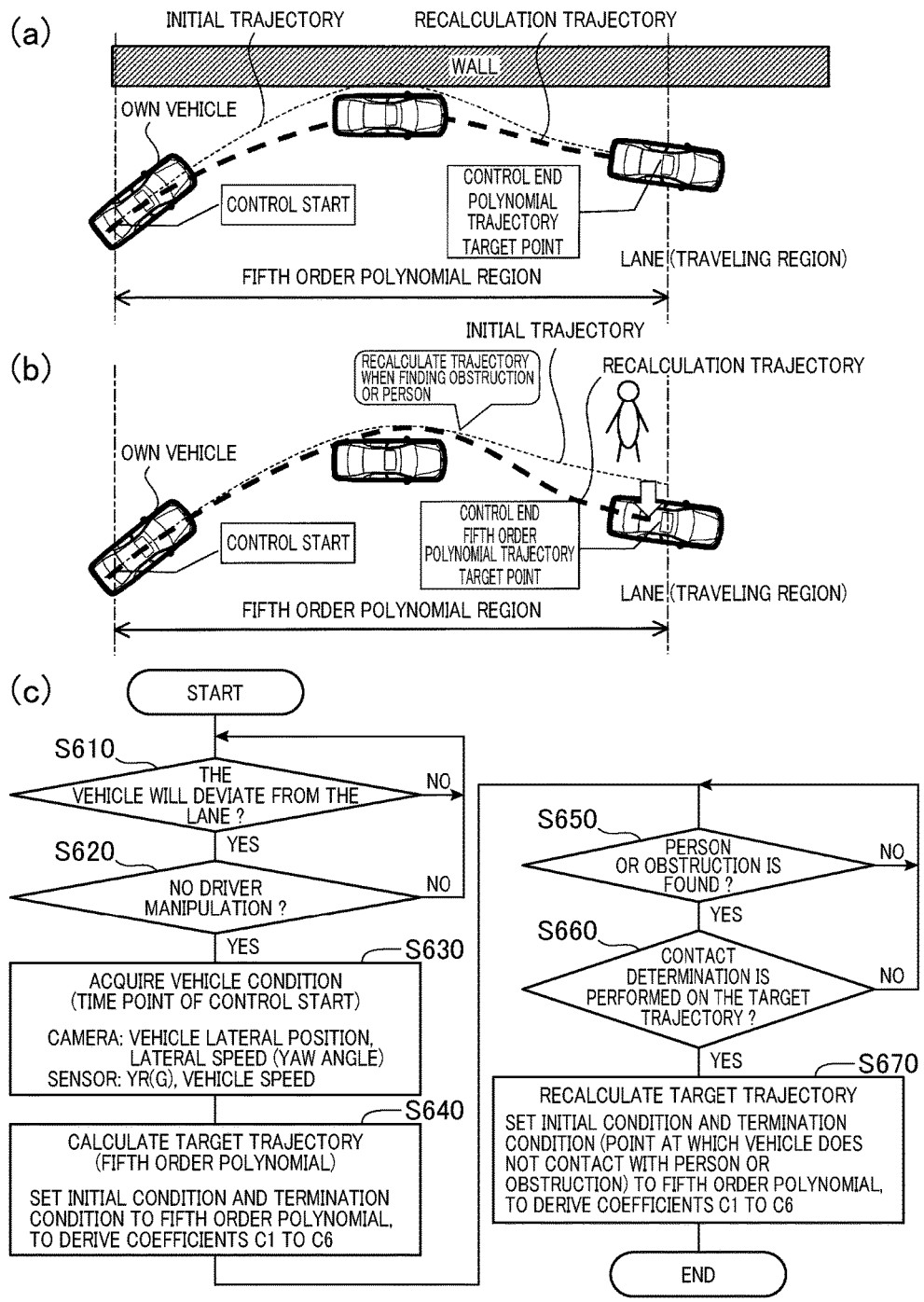
FIG. 7 is an illustration diagram relating to a lane deviating suppressing processing (6).

Next, the lane deviating suppressing processing (6) is explained with reference to FIG. 7. FIG. 7 (a) is an illustration diagram illustrating the lane deviation suppressing processing (6). FIG. 7 (b) is an illustration diagram illustrating the lane deviation suppressing processing (6). FIG. 7 (c) is a flowchart illustrating the lane deviation suppressing processing (6).

At first step S610, the calculation unit 10 judges whether or not the vehicle deviates from the lane. Since this processing is similar to step S110 of the lane deviation suppressing processing (1), detailed description is omitted, here. At step S610, if the calculation unit 10 judges that the vehicle does not deviate from the lane within the criterion time, it executes step S610 again. On the other hand, at step S610, if the calculation unit 10 judges that the vehicle deviates from the lane within the criterion time, the processing flow proceeds to step S620.

At step S620, the calculation unit 10 determines whether or not there is manipulation by a driver. Since this processing is similar to step S120 of the lane deviation suppressing processing (1), detailed description is omitted, here. At step S620, if there is the manipulation by the driver, the processing flow proceeds to step S610. On the other hand, at step S620, if there is no manipulation by the driver, the processing flow proceeds to step S630.

At step S630, the calculation unit 10 acquires a vehicle condition at a control start point. Since this processing is similar to step S130 of the lane deviation suppressing processing (1), detailed description is omitted, here. After that, the processing flow proceeds to step S640.

At step S640, the calculation unit 10 calculates a first target trajectory. The first target trajectory is obtained using the polynomial of fifth order with respect to time t as the following formulas. Ay is an acceleration (acceleration in the lateral direction), Vy is a lateral speed (speed in the lateral direction), and Y is a lateral position (position in the lateral direction). The calculation unit 10 sets an initial condition and a termination condition to each formula, to derive coefficients C1 to C6. The initial condition is a condition to be set at a time point of a control start. In addition, the termination condition is a condition to be set at a time point of a control end. A point, at which the vehicle is located at the time point of the control end, is set as the target point. The calculation unit 10 can also set the maximum deviation position Y1 in the termination condition. Note that, instead of the fifth order polynomial, the calculation unit 10 may calculate the target trajectory using the sixth or higher order polynomial. After that, the processing flow proceeds to step S650.

Fifth Order Polynomial Target Object (First and Second Trajectories in Common)

$A_y$: Acceleration, $V_y$: Lateral Speed, Y: Lateral position $$A_y = C_1 t^3 + C_2 t^2 + C_3 t + C_4$$

$$V_y = \tfrac{1}{4} C_1 t^4 + \tfrac{1}{3} C_2 t^3 + \tfrac{1}{2} C_3 t^2 + C_4 t + C_5$$

$$Y = \tfrac{1}{20} C_1 t^5 + \tfrac{1}{12} C_2 t^4 + \tfrac{1}{6} C_3 t^3 + \tfrac{1}{2} C_4 t^2 + C_5 t + C_6 \quad \text{[Math. 10]}$$

First Trajectory—Initial Condition, Termination Condition
Maximum deviation position Y1 can be set
$t_1 = 0 \quad t_1 = T_1$
$A_{1y} = a_0 \quad A_{1y} = a_1$
$V_{1y} = v_0 \quad V_{1y} = v_1$
$Y_1 = y_0 \quad Y_1 = y_1$ At the first step S650, the calculation unit 10 judges whether or not a person or an obstruction is found. In this step, the calculation unit 10 judges that a person, an obstruction, or the like is found, if there is the person, the obstruction, or the like in front of the vehicle traveling along the target trajectory. The calculation unit 10 judges that a person, an obstruction, or the like is not found, if there is no person, the obstruction, or the like in front of the vehicle traveling along the target trajectory. At step S650, if the calculation unit 10 judges that a person, an obstruction, or the like is not found, it executes step S650 again. On the other hand, at step S650, if the calculation unit 10 judges that a person, an obstruction, or the like is found, the processing flow proceeds to step S660.

At step S660, the calculation unit 10 performs a contact determination on the target trajectory. In this step, the calculation unit 10 judges whether or not the vehicle traveling along the target trajectory will contact the obstruction in front of the vehicle that is found at step S650. At step S660, as the result of the contact determination on the target trajectory, if the calculation unit 10 judges that the vehicle traveling along the target trajectory will not contact the obstruction in front of the vehicle, the calculation unit 10 judges that the recalculation of the target trajectory is unnecessary and then the processing flow proceeds to step S650. On the other hand, at step S660, as the result of the contact determination on the target trajectory, if the calculation unit 10 judges that the vehicle traveling along the target trajectory will contact the obstruction in front of the vehicle, the calculation unit 10 judges that the recalculation of the target trajectory is necessary and then the processing flow proceeds to step S670.

At step S670, the calculation unit 10 recalculates the target trajectory. The target trajectory is obtained using the polynomial of fifth order with respect to time t as the following formulas. Ay is an acceleration (acceleration in the lateral direction), Vy is a lateral speed (speed in the lateral direction), and Y is a lateral position (position in the lateral direction). The calculation unit 10 sets an initial condition and a termination condition as follows to each formula, to derive coefficients C1 to C6. The initial condition is a condition to be set at a time point of a control start. In addition, the termination condition is a condition to be set at a time point of a control end. A point at which the vehicle will not contact the obstruction is set as the time point of the control end. A point at which the vehicle is located at the time point of the control end, is set as the target point. In this manner, the initial condition and the termination condition are reset, and then the target trajectory is recalculated. Note that, instead of the fifth order polynomial, the calculation unit 10 may calculate the target trajectory using the sixth or higher order polynomial. After that, this processing ends.

In the lane deviation suppressing processing (6), at step S640, the target trajectory calculation unit 111 in the calculation unit 10 executes the processing. At steps S650 and S660, the traveling state judgement unit 112 executes the processing. At step S670, the target trajectory recalculation unit 113 executes the processing.

Fifth Order Polynomial Target Object (First and Second Trajectories in Common)

$A_y$: Acceleration, $V_y$: Lateral Speed, Y: Lateral position $$A_y = C_1 t^3 + C_2 t^2 + C_3 t + C_4$$

$$V_y = \tfrac{1}{4} C_1 t^4 + \tfrac{1}{3} C_2 t^3 + \tfrac{1}{2} C_3 t^2 + C_4 t + C_5$$

$$Y = \tfrac{1}{20} C_1 t^5 + \tfrac{1}{12} C_2 t^4 + \tfrac{1}{6} C_3 t^3 + \tfrac{1}{2} C_4 t^2 + C_5 t + C_6 \quad \text{[Math. 11]}$$

Second Trajectory (Recalculation Trajectory)—Initial Condition, Termination Condition $t_2 = 0 \quad t_2 = T_{end}$
$A_{2y} = a_2 \quad A_{2y} = a_{end}$
$V_{2y} = v_2 \quad V_{2y} = v_{end}$
$Y_2 = y_2 \quad Y_2 = y_{end}$ 2.7. Explanation of the Lane Deviation Suppressing Processing (7)

Figure 8:
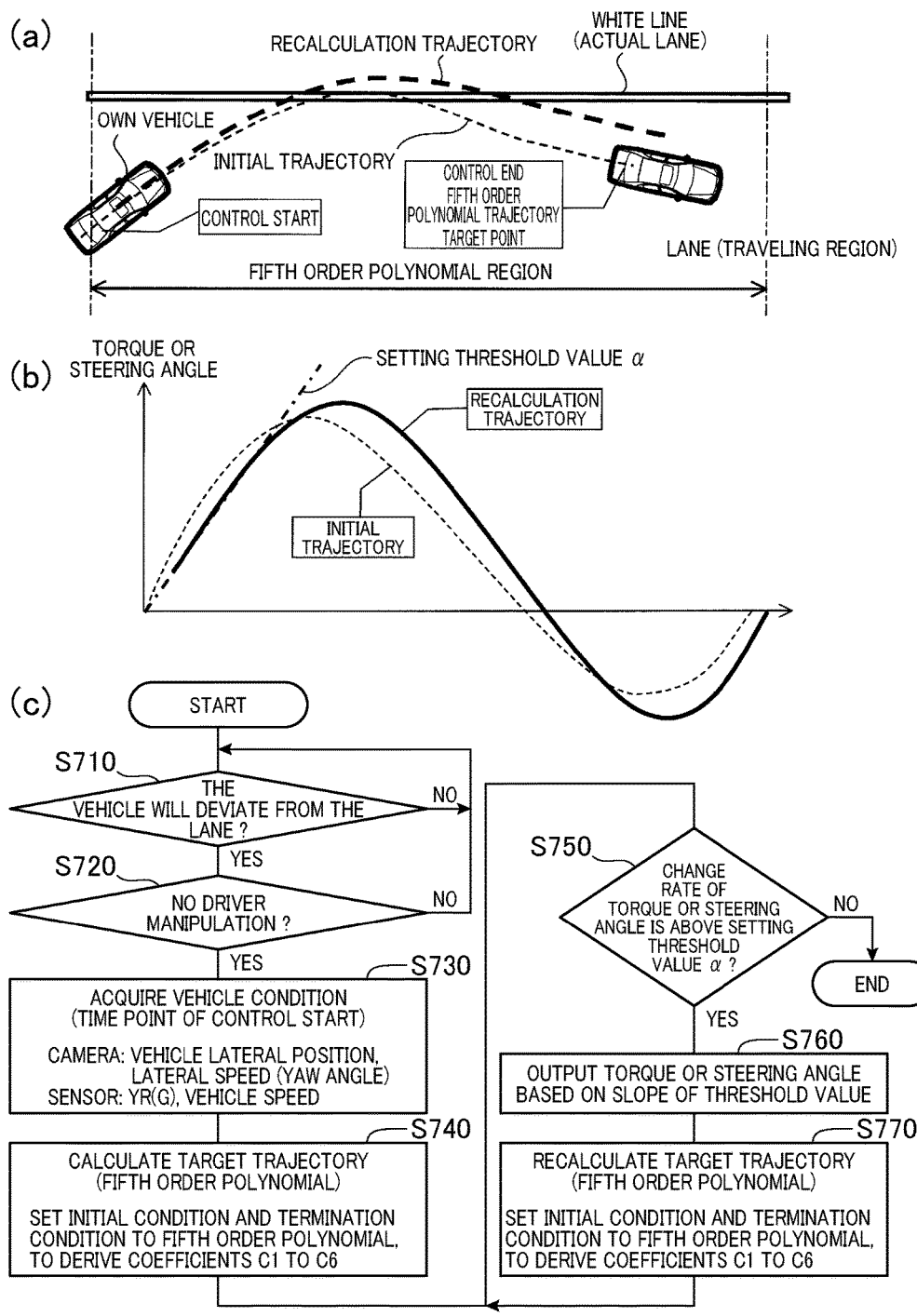
FIG. 8 is an illustration diagram relating to a lane deviating suppressing processing (7).

Next, the lane deviating suppressing processing (7) is explained with reference to FIG. 8. FIG. 8 (a) is an illustration diagram illustrating the lane deviation suppressing processing (7). FIG. 8 (b) is an illustration diagram illustrating the lane deviation suppressing processing (7). FIG. 8 (c) is a flowchart illustrating the lane deviation suppressing processing (7).

At first step S710, the calculation unit 10 judges whether or not the vehicle deviates from the lane. Since this processing is similar to step S110 of the lane deviation suppressing processing (1), detailed description is omitted, here. At step S710, if the calculation unit 10 judges that the vehicle does not deviate from the lane within the criterion time, it executes step S710 again. On the other hand, at step S710, if the calculation unit 10 judges that the vehicle deviates from the lane within the criterion time, the processing flow proceeds to step S720.

At step S720, the calculation unit 10 determines whether or not there is manipulation by a driver. Since this processing is similar to step S120 of the lane deviation suppressing processing (1), detailed description is omitted, here. At step S720, if there is the manipulation by the driver, the processing flow proceeds to step S710. On the other hand, at step 720, if there is no manipulation by the driver, the processing flow proceeds to step S730.

At step S730, the calculation unit 10 acquires a vehicle condition at a control start point. Since this processing is similar to step S130 of the lane deviation suppressing processing (1), detailed description is omitted, here. After that, the processing flow proceeds to step S740.

At step S740, the calculation unit 10 calculates the target trajectory. The target trajectory is obtained using the polynomial of fifth order with respect to time t as the following formulas. Ay is an acceleration (acceleration in the lateral direction), Vy is a lateral speed (speed in the lateral direction), and Y is a lateral position (position in the lateral direction). The calculation unit 10 sets an initial condition and a termination condition to each formula, to derive coefficients C1 to C6. The initial condition is a condition to be set at a time point of a control start. In addition, the termination condition is a condition to be set at a time point of a control end. A point, at which the vehicle is located at the time point of the control end, is set as the target point. As for a time Tend, an optimum value thereof is calculated so that a steering behavior or a deviation amount becomes a value within a target value. Note that, instead of the fifth order polynomial, the calculation unit 10 may calculate the target trajectory using the sixth or higher order polynomial. After that, the processing flow proceeds to step S750.

Fifth Order Polynomial Target Object $A_y$: Acceleration, $V_y$: Lateral Speed, Y: Lateral position $$A_y = C_1 t^3 + C_2 t^2 + C_3 t + C_4$$

$$V_y = \tfrac{1}{4} C_1 t^4 + \tfrac{1}{3} C_2 t^3 + \tfrac{1}{2} C_3 t^2 + C_4 t + C_5$$

$$Y = \tfrac{1}{20} C_1 t^5 + \tfrac{1}{12} C_2 t^4 + \tfrac{1}{6} C_3 t^3 + \tfrac{1}{2} C_4 t^2 + C_5 t + C_6 \quad \text{[Math. 12]}$$

Initial Condition (Time Point of Control Start), Termination Condition (Time Point of Control End)

$t = 0 \quad t = T_{end}$
$A_y = a_0 \quad A_y = a_{end}$
$V_y = v_0 \quad V_y = v_{end}$
$Y = y_0 \quad Y = y_{end}$ At step S750, the calculation unit 10 judges whether or not a change rate of a torque or a change rate of a steering angle exceeds a setting threshold value α. As the torque, the steering control apparatus included in the controlled object apparatus 30 detects the torque from the steering mechanism. In addition, the setting threshold value α is preset by experimentation and so on, in terms of prevention of sudden steering behavior. Therefore, if the change rate of the torque or the change rate of the steering angle exceeds the setting threshold value α, the calculation unit 10 judges that the steering behavior of the vehicle exceeds the threshold value during traveling on the target trajectory, and the sudden steering behavior occurs. At step S750, if the calculation unit 10 judges that the change rate of the torque or the change rate of the steering angle does not exceed the setting threshold value α, the calculation unit 10 judges that the sudden steering behavior does not occur and therefore the recalculation of the target trajectory is unnecessary, and then ends this processing. On the other hand, at step S750, if the calculation unit 10 judges that the change rate of the torque or the change rate of the steering angle exceeds the setting threshold value α, the calculation unit 10 judges that the sudden steering behavior occurs and therefore the recalculation of the target trajectory is necessary, and then the processing flow proceeds to step S760.

At step S760, the calculation unit 10 outputs a torque or a steering angle based on a slope of a threshold value. In particular, the calculation unit 10 outputs a torque value or a steering angle value so that the change rate of the torque or the change rate of the steering angle is less than the setting threshold value α. After that, the processing flow proceeds to step S770.

At step S770, the calculation unit 10 recalculates the target trajectory. The target trajectory is obtained using the polynomial of fifth order with respect to time t as the following formulas. Ay is an acceleration (acceleration in the lateral direction), Vy is a lateral speed (speed in the lateral direction), and Y is a lateral position (position in the lateral direction). The calculation unit 10 sets an initial condition and a termination condition as follows to each formula, to derive coefficients C1 to C6. The initial condition is a condition to be set at a time point of a control start. In addition, the termination condition is a condition to be set at a time point of a control end. A point, at which the vehicle is located at the time point of the control end, is set as the target point. The termination condition is set based on the torque value or the steering angle value that is output at step S760, in terms of prevention of sudden steering behavior. In this manner, the initial condition and the termination condition are reset, and then the target trajectory is recalculated. Note that, instead of the fifth order polynomial, the calculation unit 10 may calculate the target trajectory using the sixth or higher order polynomial. Note that, at step S770, the calculation unit 10 may execute a behavior suppressing operation for suppressing the steering behavior of the vehicle at the same time with the recalculation of the target trajectory or instead of the recalculation thereof. The behavior suppressing operation includes: canceling an execution of the deviation suppressing operation by controlling the steering mechanism with the controlled object apparatus 30; decelerating the vehicle by controlling the drive mechanism or the braking mechanism with the controlled object apparatus 30; reporting a state to a driver, with a sound output by a buzzer or a speaker, or a display by a display apparatus or a lamp, using the information output apparatus 40; and so on. After that, the processing flow proceeds to step S750.

In the lane deviation suppressing processing (7), at step S740, the target trajectory calculation unit 111 in the calculation unit 10 executes the processing. At step S750, the traveling state judgement unit 112 executes the processing. At step S770, the target trajectory recalculation unit 113 executes the processing.

Fifth Order Polynomial Target Object $A_y$: Acceleration, $V_y$: Lateral Speed, Y: Lateral position $$A_y = C_1 t^3 + C_2 t^2 + C_3 t + C_4$$

$$V_y = \tfrac{1}{4} C_1 t^4 + \tfrac{1}{3} C_2 t^3 + \tfrac{1}{2} C_3 t^2 + C_4 t + C_5$$

$$Y = \tfrac{1}{20} C_1 t^5 + \tfrac{1}{12} C_2 t^4 + \tfrac{1}{6} C_3 t^3 + \tfrac{1}{2} C_4 t^2 + C_5 t + C_6 \qquad \text{[Math. 13]}$$

Initial Condition (Time Point of Control Start), Termination Condition (Time Point of Control End)

$t=0$ $t=T_{end}$
$A_y = a_0$ $A_y = a_{end}$
$V_y = v_0$ $V_y = v_{end}$
$Y = y_0$ $Y = y_{end}$ 3. Effects on the Embodiment The lane deviation suppressing system 1 in this embodiment calculates a target trajectory for causing a vehicle to travel to a target point, and then recalculates the target trajectory depending on a traveling state of the vehicle. Therefore, the lane deviation suppressing system 1 can generate a target trajectory capable of corresponding to various vehicle deviation situations.

The invention claimed is:

1. A lane deviation suppressing system mounted in a vehicle and suppressing deviation of the vehicle from a lane during traveling, comprising:
   a target trajectory generation unit configured to generate, using a processor, a target trajectory for causing the vehicle to travel;
   a control command transmission unit configured to generate and transmit, using the processor, a control command for causing the vehicle to travel along the target trajectory generated by the target trajectory generation unit; and
   a deviation suppressing operation unit configured to execute, using the processor, a deviation suppressing operation for suppressing deviation of the vehicle from the lane during traveling, based on the control command transmitted from the control command transmission unit;
   the target trajectory generation unit comprising:
   a target trajectory calculation unit configured to set, using the processor, a target point on a front side in the lane when the vehicle travels, and calculate, as the target trajectory, a trajectory for causing the vehicle to travel to the set target point, using a polynomial of fifth or higher order with respect to time;
   a traveling state judgement unit configured to judge, using the processor, that a recalculation of the target trajectory is necessary, if the vehicle traveling along the target trajectory returns to the target point after separating from the target point in an orthogonal direction orthogonal to an extending direction of the lane; and
   a target trajectory recalculation unit configured to recalculate, using the processor, the target trajectory using any one of the polynomial of fifth or higher order with respect to time and a polynomial of first order with respect to time, if the traveling state judgement unit judges that the recalculation of the target trajectory is necessary.

2. The lane deviation suppressing system according to claim 1, wherein the target trajectory recalculation unit is configured to select, using the processor, any one of the polynomial of fifth or higher order with respect to time and the polynomial of first order with respect to time, depending on a traveling state of the vehicle, in order to recalculate the target trajectory.

3. The lane deviation suppressing system according to claim 1, wherein the target trajectory recalculation unit is configured to calculate, using the processor, a lateral speed at which the vehicle moves in the orthogonal direction orthogonal to the extending direction of the lane if recalculating the target trajectory using the polynomial of first order with respect to time, and recalculate a trajectory for causing the vehicle to travel at the calculated lateral speed, as the target trajectory.

4. The lane deviation suppressing system according to claim 3, wherein the target trajectory recalculation unit is configured to calculate, using the processor, the lateral speed depending on a curvature of the lane on which the vehicle travels.

5. A lane deviation suppressing system mounted in a vehicle and suppressing deviation of the vehicle from a lane during traveling, comprising:
   a target trajectory generation unit configured to generate, using a processor, a target trajectory for causing the vehicle to travel;
   a control command transmission unit configured to generate and transmit, using the processor, a control command for causing the vehicle to travel along the target trajectory generated by the target trajectory generation unit; and
   a deviation suppressing operation unit configured to execute, using the processor, a deviation suppressing operation for suppressing deviation of the vehicle from the lane during traveling, based on the control command transmitted from the control command transmission unit;
   the target trajectory generation unit comprising:
   a target trajectory calculation unit configured to set, using the processor, as a target point, a maximum deviation point at which the vehicle most deviates from the lane during traveling, and calculate, as the target trajectory, a trajectory for causing the vehicle to travel to the set target point, using a polynomial of fifth or higher order with respect to time;
   a traveling state judgement unit configured to judge, using the processor, that a recalculation of the target trajectory is necessary if the vehicle traveling along the target trajectory starts to move toward the lane after deviating from the lane in an orthogonal direction orthogonal to an extending direction of the lane; and a target trajectory recalculation unit configured to reset, using the processor, the target point on the front side in the lane if the traveling state judgement unit judges that the recalculation of the target trajectory is necessary, and calculate, as the target trajectory, a trajectory for causing the vehicle to travel to the target point to be reset, using the polynomial of fifth or higher order with respect to time.

6. The lane deviation suppressing system according to claim 5, wherein the traveling state judgement unit is configured to judge, using the processor, that the recalculation of the target trajectory is necessary, if there is also an obstruction in a direction in which the vehicle traveling along the target trajectory deviates from the lane, and the target trajectory recalculation unit is configured to change, using the processor, a distance between the lane in the orthogonal direction when the vehicle travels and the maximum deviation point if the traveling state judgement unit judges that the recalculation of the target trajectory is necessary due to a presence of the obstruction to reset the target point, and calculate, as the target trajectory, the trajectory for causing the vehicle to travel to the target point to be reset, using the polynomial of fifth or higher order with respect to time.

7. A lane deviation suppressing system mounted in a vehicle and suppressing deviation of the vehicle from a lane during traveling, comprising:

a target trajectory generation unit configured to generate, using a processor, a target trajectory for causing the vehicle to travel;

a control command transmission unit configured to generate and transmit, using the processor, a control command for causing the vehicle to travel along the target trajectory generated by the target trajectory generation unit; and a deviation suppressing operation unit configured to execute, using the processor, a deviation suppressing operation for suppressing deviation of the vehicle from the lane during traveling, based on the control command transmitted from the control command transmission unit;

the target trajectory generation unit comprising:

a target trajectory calculation unit configured to set, using the processor, a target point on a front side in the lane when the vehicle travels, and calculate, as the target trajectory, a trajectory for causing the vehicle to travel to the set target point, using a polynomial of fifth or higher order with respect to time;

a traveling state judgement unit configured to judge, using the processor, that a recalculation of target trajectory is necessary, if a distance between a trajectory on which the vehicle travels in an orthogonal direction orthogonal to an extending direction of the lane and the target trajectory is at a threshold value or more; and a target trajectory recalculation unit configured to reset, using the processor, the target point on the front side in the lane if the traveling state judgement unit judges that the recalculation of the target trajectory is necessary, and calculate, as the target trajectory, a trajectory for causing the vehicle to travel to the target point to be reset, using the polynomial of fifth or higher order with respect to time.

8. A lane deviation suppressing system mounted in a vehicle and suppressing deviation of the vehicle from a lane during traveling, comprising:

a target trajectory generation unit configured to generate, using a processor, a target trajectory for causing the vehicle to travel;

a control command transmission unit configured to generate and transmit, using the processor, a control command for causing the vehicle to travel along the target trajectory generated by the target trajectory generation unit; and a deviation suppressing operation unit configured to execute, using the processor, a deviation suppressing operation for suppressing deviation of the vehicle from the lane during traveling, based on the control command transmitted from the control command transmission unit;

the target trajectory generation unit comprising:

a target trajectory calculation unit configured to set, using the processor, a target point on a front side in the lane when the vehicle travels, and calculate, as the target trajectory, a trajectory for causing the vehicle to travel to the set target point, using a polynomial of fifth or higher order with respect to time;

a traveling state judgement unit configured to judge, using the processor, that a calculation of the target trajectory is necessary if the vehicle traveling along the target trajectory will contact an obstruction on the front side of the vehicle; and a target trajectory recalculation unit configured to reset, using the processor, a point at which the vehicle will not contact the obstruction as a target point if the traveling state judgement unit judges that the recalculation of the target trajectory is necessary, and calculate, as the target trajectory, a trajectory for causing the vehicle to travel to the target point to be reset, using the polynomial of fifth or higher order with respect to time.

9. A lane deviation suppressing system mounted in a vehicle and suppressing deviation of the vehicle from a lane during traveling, comprising:

a target trajectory generation unit configured to generate, using a processor, a target trajectory for causing the vehicle to travel;

a control command transmission unit configured to generate and transmit, using the processor, a control command for causing the vehicle to travel along the target trajectory generated by the target trajectory generation unit; and a deviation suppressing operation unit configured to execute, using the processor, a deviation suppressing operation for suppressing deviation of the vehicle from the lane during traveling, based on the control command transmitted from the control command transmission unit;

the target trajectory generation unit comprising:

a target trajectory calculation unit configured to set, using the processor, a target point on a front side in the lane when the vehicle travels, and calculate, as the target trajectory, a trajectory for causing the vehicle to travel to the set target point, using a polynomial of fifth or higher order with respect to time;

a traveling state judgement unit configured to judge, using the processor, whether or not a steering behavior of the vehicle exceeds a threshold value when the vehicle travels on the target trajectory; and a target trajectory recalculation unit configured to reset, using the processor, the target point on the front side in the lane if the traveling state judgement unit judges that the steering behavior of the vehicle exceeds the threshold value during traveling on the target trajectory, and calculate, as the target trajectory, a trajectory for causing the vehicle to travel to the target point to be reset, using the polynomial of fifth or higher order with respect to time so that the steering behavior of the vehicle during traveling on the target trajectory is less than the threshold value;

the lane deviation suppressing system further comprising:

behavior suppressing operation units configured to execute, using the processor, a behavior suppressing operation for suppressing the steering behavior of the vehicle, at the same time with a recalculation of the target trajectory by the target trajectory recalculation unit or instead of a recalculation of the target trajectory by the target trajectory recalculation unit, if the traveling state judgement unit judges that the steering behavior of the vehicle exceeds the threshold value during traveling on the target trajectory.

10. The lane deviation suppressing system according to claim 9, wherein the behavior suppressing operation unit is configured to cancel, using the processor, an execution of the deviation suppressing operation by the deviation suppressing operation unit, as the behavior suppressing operation.

11. The lane deviation suppressing system according to claim 9, wherein the behavior suppressing operation unit is configured to decelerate, using the processor, the vehicle, as the behavior suppressing operation.

12. The lane deviation suppressing system according to claim 9, wherein the behavior suppressing operation unit is configured to report, using the processor, to a driver, that the steering behavior of the vehicle exceeds the threshold value during traveling on the target trajectory, as the behavior suppressing operation.

* * * * *